US010273888B2

(12) United States Patent
Sellnau et al.

(10) Patent No.: US 10,273,888 B2
(45) Date of Patent: Apr. 30, 2019

(54) GDCI TRANSIENT EGR ERROR COMPENSATION

(71) Applicant: DELPHI TECHNOLOGIES IP LIMITED, St. Michael (BB)

(72) Inventors: Mark C. Sellnau, Bloomfield Hills, MI (US); Wayne R. Moore, Goodrich, MI (US); James F. Sinnamon, Birmingham, MI (US)

(73) Assignee: DELPHI TECHNOLOGIES IP LIMITED (BB)

( * ) Notice: Subject to any disclaimer, the term of this patent is extended or adjusted under 35 U.S.C. 154(b) by 131 days.

(21) Appl. No.: 15/043,739

(22) Filed: Feb. 15, 2016

(65) Prior Publication Data
US 2017/0234257 A1   Aug. 17, 2017

(51) Int. Cl.
| F02D 35/02 | (2006.01) |
| F02D 41/00 | (2006.01) |
| F02D 41/10 | (2006.01) |
| F02D 41/40 | (2006.01) |
| F02M 26/06 | (2016.01) |

(52) U.S. Cl.
CPC ......... F02D 35/028 (2013.01); F02D 41/005 (2013.01); F02D 41/0072 (2013.01); F02D 41/10 (2013.01); F02D 41/402 (2013.01); F02M 26/06 (2016.02)

(58) Field of Classification Search
CPC ............... F02D 41/2467; F02D 35/028; F02D 41/0077; F02D 2200/1002
See application file for complete search history.

(56) References Cited

U.S. PATENT DOCUMENTS

| 2002/0124828 | A1* | 9/2002 | Shirakawa | ............ F02D 41/005 123/299 |
| 2003/0024246 | A1* | 2/2003 | Beck | ........................ F02B 1/12 60/599 |
| 2006/0196466 | A1* | 9/2006 | Kuo | ........................ F01L 1/344 123/295 |
| 2006/0196469 | A1* | 9/2006 | Kuo | .......................... F02D 9/02 123/305 |
| 2008/0202469 | A1* | 8/2008 | Kang | .................... F02D 35/023 123/435 |
| 2008/0271436 | A1* | 11/2008 | Najt | ...................... F01N 3/2006 60/285 |
| 2009/0071440 | A1* | 3/2009 | Ashizawa | ............ F02B 23/101 123/406.29 |
| 2013/0139794 | A1* | 6/2013 | Hiroe | .................. F02D 41/0077 123/568.11 |

(Continued)

Primary Examiner — Joseph J Dallo
Assistant Examiner — Kurt Philip Liethen
(74) Attorney, Agent, or Firm — Joshua M. Haines

(57) ABSTRACT

A GDCI engine recirculates exhaust gases to a combustion chamber using desired early injection parameters for a steady state engine operation from a controller. An engine control system detects a load increase relative to the steady state engine operation, and insufficient recirculated exhaust gases to the combustion chamber are delivered in response to the detected load increase as a result of transport delays. A last fuel injection into the combustion chamber during an engine cycle with multiple fuel injections is delayed as compared to the steady state engine operation. Combustion phasing within the combustion chamber is retarded in response to the delayed injection.

20 Claims, 4 Drawing Sheets

(56) References Cited

U.S. PATENT DOCUMENTS

| | | | | |
|---|---|---|---|---|
| 2015/0051809 A1* | 2/2015 | Glugla | ............... | F02D 17/02 |
| | | | | 701/103 |
| 2015/0053177 A1* | 2/2015 | Wooldridge | ............ | F02D 43/00 |
| | | | | 123/406.3 |
| 2016/0356228 A1* | 12/2016 | Liu | ................... | F02D 41/064 |
| 2017/0191442 A1* | 7/2017 | Polonowski | ............ | F02D 41/064 |

* cited by examiner

GDCI TRANSIENT EGR ERROR COMPENSATION

STATEMENT REGARDING FEDERALLY SPONSORED RESEARCH OR DEVELOPMENT

This invention was made with government support under Contract No. DE-EE0003258 awarded by the Department of Energy. The government has certain rights in the invention.

BACKGROUND

This disclosure relates to an engine control system and method used to compensate for transient EGR error in a Gasoline Direct-Injection Compression-Ignition (GDCI) engine.

Exhaust gas recirculation (EGR) using a low-pressure loop (LPL) is increasingly used for turbocharged spark-ignited engines and compression ignited engines. The LPL supplies exhaust gases downstream from the turbocharger back to the engine's combustion chambers. By way of contrast, a high-pressure loop (HPL) would recirculate exhaust gases back to the combustion chambers from a location upstream of the turbocharger.

LPL EGR is typically preferred over HPL EGR for several reasons, including, a) there is less compromise of the boost system since EGR gases are drawn after the turbocharger, b) the exhaust gases can be cleaned in a catalyst to reduce soot and hydrocarbons that may otherwise foul the engine air system, and c) the exhaust gases are cooler and closer to target charge temperatures with reduced cooler heat load. However. LPL EGR has a disadvantage for engine response time in that LPL EGR systems have relatively long ducts between the EGR valve and the intake ports to the combustion chambers. This causes greater delay to deliver EGR to the cylinders during load transients.

EGR transport delay is defined as the time required for EGR gases to flow from the EGR valve to the intake valves. EGR transport delay causes the EGR to deviate during transients from the calibrated EGR level determined in steady state dynamometer tests. EGR errors compromise transient performance because combustion phasing depends on the amount of EGR in the cylinder. Excessively high amounts of EGR produce longer ignition delay, retarded combustion phasing, and potentially misfires. Too low amounts of EGR cause shorter ignition delay, advanced combustion phasing, and may lead to excessive combustion noise. Deviations from the calibrated, steady state EGR level will also cause compromises in fuel consumption and emissions.

Inert EGR is defined as the burned species portion of the EGR gases, not including the unburned air portion of the EGR. During a fast load increase ("tip in"), it is apparent that inert EGR is lower than targets and inert EGR error may be large. Similarly, for a fast load decrease ("tip out"). EGR transport delay causes higher than desired EGR. This is because the EGR in the EGR and air systems is higher before the tip out than what is demanded after the tip out. The EGR must purge out prior to reaching lower targeted levels. The time difference between desired and actual EGR is an estimate of EGR transport delay. EGR transport delay for some GDCI engines may be in the range of 0.5 to 0.7 sec.

While the EGR and air systems are designed to be compact with the least possible volume and duct length, there will always be some amount of EGR transport delay that causes deviation during fast transients from the calibrated steady state values. What is needed is a system and method to compensate for EGR errors during momentary fast transients.

SUMMARY

In one exemplary embodiment, a method of controlling combustion includes the step of recirculating exhaust gases to a combustion chamber using desired early injection parameters for a steady state engine operation. A load increase is detected relative to the steady state engine operation. Insufficient recirculated exhaust gases are delivered to the combustion chamber in response to the detected load increase. A last fuel injection is delayed into the combustion chamber during an engine cycle with multiple fuel injections as compared to the steady state engine operation. Combustion phasing is retarded within the combustion chamber in response to the delayed injection.

In a further embodiment of any of the above, the step of recirculating exhaust gases includes recirculating exhaust gases downstream from a turbocharger to an intake manifold upstream from the combustion chamber.

In a further embodiment of any of the above, the last fuel injection under the desired early injection parameters for the steady state engine operation occurs between 50° before top dead center and 30° before top dead center. The delayed last fuel injection occurs between 30° before top dead center and 0° before top dead center.

In a further embodiment of any of the above, an ignition dwell for the delayed last fuel injection is between 30° and 15°.

In a further embodiment of any of the above, the delayed last fuel injection occurs between 30° before top dead center and 0° before top dead center at 1500 engine crankshaft revolutions per minute.

In a further embodiment of any of the above, the multiple fuel injections include first and second fuel injections. The delaying step includes delaying the first and second fuel injections to the combustion chamber compared to the steady state engine operation during the engine cycle.

In a further embodiment of any of the above, the multiple fuel injections include first and second fuel injections. The delaying step includes changing the quantities of injected fuel compared to the steady state engine operation during the engine cycle.

In a further embodiment of any of the above, the step of detecting a load increase is performed prior to the step of reducing recirculated exhaust gases.

In a further embodiment of any of the above, the step of reducing recirculated exhaust gases is a result of a lag in transport of the recirculated exhaust gases in response to an acceleration request.

In a further embodiment of any of the above, all fuel injections under the desired early injection parameters for the engine cycle occur before top dead center.

In a further embodiment of any of the above, all fuel injections under all engine operating conditions for the engine cycle occur before top dead center.

In another exemplary embodiment, an engine control system includes a fuel injector configured to deliver multiple fuel injections to a combustion chamber. The multiple fuel injections includes a last fuel injection. An exhaust gas recirculation passage is configured to supply exhaust gases to a location upstream from the combustion chamber. A controller includes a steady state calibration table of desired early injection parameters for a steady state engine operation. An exhaust gas recirculation estimator relates to a transport delay associated with a departure from the steady state calibration table. A comparator is configured to calculate a delay compensation for the last fuel injection using the exhaust gas recirculation estimator and the steady state calibration table. The controller is configured to command the fuel injector to deliver the multiple injections with the delayed last fuel injection to compensate for the transport delay.

In a further embodiment of any of the above, the steady state calibration table provides desired steady state values for a manifold absolute pressure, a late inlet valve closing timing, a start of injection for the multiple fuel injections, and a fuel mass for the multiple fuel injections, which are based upon an engine speed and indicated mean effective pressure.

In a further embodiment of any of the above, the steady state calibration table provides desired steady state values for an exhaust gas recirculation, a 50% fuel burn for the multiple fuel injections and an ignition dwell, which are based upon an engine speed and indicated mean effective pressure.

In a further embodiment of any of the above, the exhaust gas recirculation estimator is configured to estimate an amount of exhaust gas recirculation based upon an engine speed, an indicated mean effective pressure, an intake manifold temperature, an intake manifold pressure, and an airflow to the combustion chamber.

In a further embodiment of any of the above, the controller is configured to determine an exhaust gas recirculation error based upon an estimated exhaust gas recirculation from the exhaust gas recirculation estimator and an expected exhaust gas recirculation from the steady state calibration table.

In a further embodiment of any of the above, the comparator is configured to determine the delayed last fuel injection and a fuel mass for the multiple fuel injections based upon the exhaust gas recirculation error.

In a further embodiment of any of the above, the comparator is configured to determine the delayed last fuel injection and a fuel mass for the multiple fuel injections based upon at least one of a manifold absolute pressure, a late inlet valve closure timing, a start of injection for the multiple fuel injections, a fuel mass for the multiple fuel injections, an exhaust gas recirculation, a 50% fuel burn for the multiple fuel injections and an ignition dwell from the steady state calibration table.

In a further embodiment of any of the above, the last fuel injection under the desired early injection parameters for the steady state engine operation occurs between 50° before top dead center and 30° before top dead center. The delayed last fuel injection occurs between 30° before top dead center and 10° before top dead center.

In a further embodiment of any of the above, an ignition dwell for the delayed last fuel injection is between 30° and 15°.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
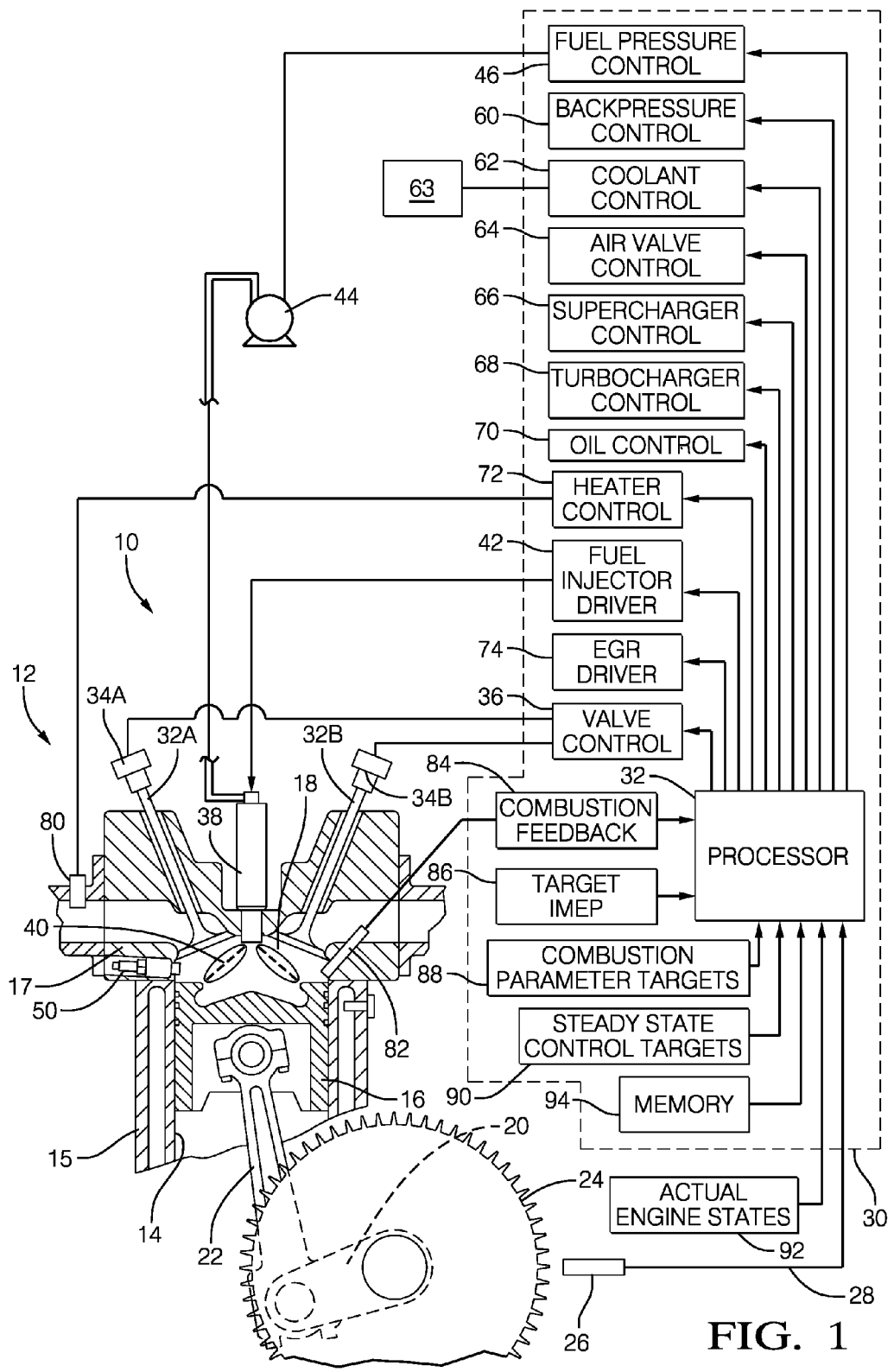
FIG. 1 is a schematic view of an embodiment of an engine control system suitable for controlling a Gasoline Direct-Injection Compression-Ignition (GDCI) engine.

FIG. 1 illustrates a non-limiting embodiment of an engine control system 10 suitable for controlling a Gasoline Direct-Injection Compression-Ignition (GDCI) internal combustion engine 12 for use in a vehicle, for example. GDCI differs from a Homogeneous Charge Compression Ignition (HCCI) in that the fuel/air mixture is intentionally non-homogeneous at the point of start of combustion (SOC) and employs a controlled distributed-equivalence-ratio mixture at SOC. That is, the fuel is stratified, providing discrete regions of equivalence-ratio, as disclosed in United States Publication No. 2013/0213349, which is incorporated herein by reference in its entirety. This distributed-equivalence ratio feature allows control of the fuel heat release timing and heat release rate as the combustion process progresses throughout the combustion chamber. Controllability of the heat release timing and rate allows GDCI to operate over essentially the entire speed and load range of the engine, which in turn may alleviate the need for mode switching and the associated efficiency losses. Although the exemplary embodiment relates to a GDCI engine, it should be understood that the disclosed engine control system and method can also be used for compression ignition diesel or HCCI engines.

While only a single cylinder is shown in FIG. 1, it will be appreciated that the disclosed system and method may be practiced independently on each cylinder of a multi-cylinder engine or commonly across multiple cylinders. The engine 12 is illustrated as having a cylinder bore 14 containing a piston 16, wherein the region above the piston 16 defines a combustion chamber 18. Linear movement of the piston 16 within the cylinder bore 14 rotationally drives a crankshaft 20 via a connecting rod 22.

During engine operation it is desirable to determine the position of the piston 16 throughout its linear travel within the cylinder bore 14, for example, from bottom dead center (BDC) to top dead center (TDC). To this end, the system 10 may include a toothed crank wheel 24 and a crank sensor 26 positioned proximate to the crank wheel 24 to sense rotational movement of the crank wheel teeth. The crank sensor 26 outputs a crank signal 28 to a controller 30 indicative of a crank angle $\theta$, which corresponds to the linear position of the piston 16, and a crank speed N.

The controller 30, such as an engine control module (ECM), may include a processor 32 or other control circuitry as should be evident to those in the art. The controller 30 and/or processor 32 may include memory 94, including non-volatile memory, such as electrically erasable programmable read-only memory (EEPROM) for storing one or more routines, thresholds and captured data. The one or more routines may be executed by the processor 32 to perform steps for determining a prior engine control parameter and scheduling a future engine control signal such that a future engine control parameter corresponds to a desired engine control parameter. FIG. 1 illustrates the processor 32 and other functional blocks as being part of the controller 30. However, it will be appreciated that it is not required that the processor 32 and other functional blocks be assembled within a single housing, and that they may be distributed about the engine 12 or vehicle. Signals to and from the controller 30 are indicated by solid arrowed lines in the figures.

One or more intake valve 32A and exhaust valve 32B are driven by one or more camshafts to regulate the flow of air into and exhaust from the combustion chamber 18. In one embodiment, a cam phaser 34A, 34B is respectively coupled to each of the intake valve 32A and the exhaust valve 32B, to provide further control of lift and/or duration of the valves beyond that provided by the camshaft profile. The cam phasers 34A, 34B are controlled by a signal from a valve control 36.

A fuel injector 38 is configured to dispense fuel 40 in accordance with an injector control signal from by an injector driver 42. Example fuels include naphtha, kerosene, diesel, or gasoline; however, other fuels may be used. The fuel injector 30 controls delivery of fuel 40 to the combustion chamber 18 from a fuel pump 44 and a fuel spill valve, for example, controlled by a fuel pressure control 46.

Desired operation of a GDCI engine relies upon achieving a distribution of desired fuel/air ratio, or equivalence ratio φ, unlike typical internal combustion engines. Unlike typical internal combustion engines, a GDCI engine controls in-cylinder conditions to achieve autoignition of the fuel, rather than relying on external ignition sources such as a spark plug or a glow plug. Unlike typical diesel engines which utilize locally rich combustion via a diffusion flame, GDCI utilizes a progressive autoignition process of a distribution of equivalence ratios varying from lean to slightly rich at the moment of start of combustion. The fuel injection profile of a GDCI engine includes one or more injection events intended to deliver partially premixed fuel to the combustion chamber 18, rather than a homogenous air/fuel mixture as is done in Homogeneous Charge Compression Ignition (HCCI) engines, for example.

Controllable aspects of the fuel injection profile may include how quickly or slowly the fuel injector 38 is turned on and/or turned off, a fuel rate of fuel 40 dispensed by the fuel injector 38 while the fuel injector 38 is on, the initiation timing and duration of one or more fuel injections as a function of engine crank angle θ, the number of fuel injections dispensed to achieve a combustion event, and/or the pressure at which fuel is supplied to the fuel injector 38 by the fuel pump 44. Varying one or more of these aspects of the fuel injection profile may be effective to control autoignition. The engine 12 may also be equipped with an ignition source such as a spark plug 50 to assist with initial engine starting, if desired.

In order to achieve autoignition of the air/fuel mixture over essentially the entire speed-load range of the engine while achieving exceptional fuel consumption, noise, and emissions results, a multiple late-injection, partially premixed, low-temperature combustion process is used. Fuel 40 is injected by the fuel injector 38, where the fuel injector is fed by a fuel rail at a pressure in the range of 50 to 500 bar, late on the compression stroke using a number of distinct injection events to produce a certain state of controlled air/fuel mixture in the combustion chamber 18. The state of stratification in the combustion chamber 18 along with cylinder air charge properties controls the time at which autoignition occurs and the rate at which it proceeds. Depending on engine speed and load, single-injection, double-injection, triple-injection, quadruple-injection, quintuple-injection, or higher order strategies may be used. Fuel may be injected late on the compression stroke and generally in the range of 100 crank angle degrees before top dead center to 10 crank angle degrees after top dead center under most operating conditions, but other conditions may require injection timing outside this range.

The engine control system 10 includes one or more engine control devices operable to control an engine control parameter in response to an engine control signal, wherein the engine control parameter influences when autoignition initiates and the rate at which autoignition propagates through the combustion chamber 18. Aspects of the engine control system 10 will be more fully understood with reference to the air and exhaust gas paths of the engine 12, shown in FIG. 2.

Figure 2:
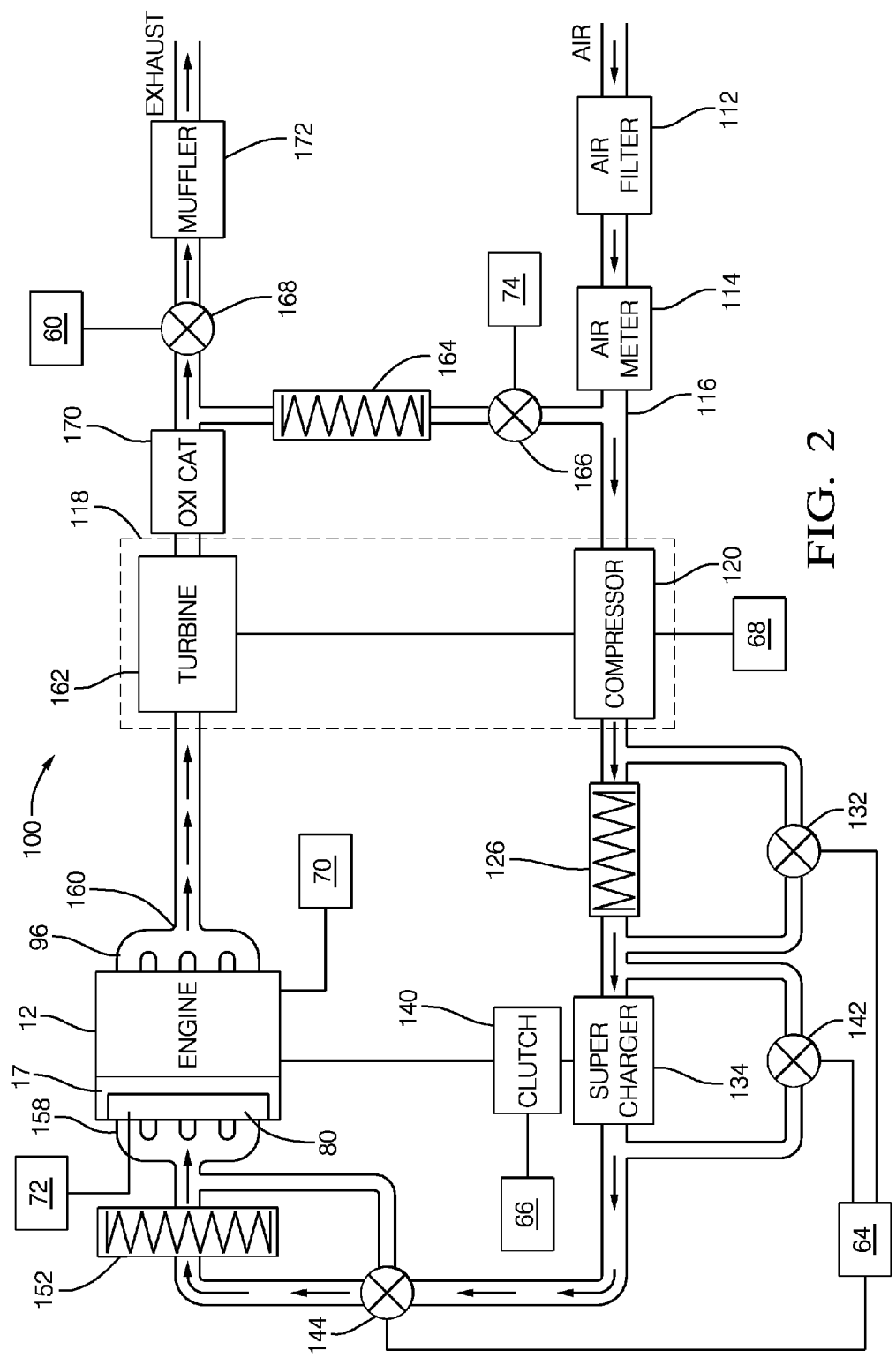
FIG. 2 is a schematic view of an embodiment of air and exhaust gas paths of the engine shown in FIG. 1.

FIG. 2 is a schematic view of a non-limiting embodiment of a gas path system 100 for providing air to and expelling exhaust from the combustion chamber 18 of the engine 12 in FIG. 1. More or fewer components than shown may be used, and the gas paths may be configured differently than illustrated.

Referring to FIG. 2, air passes through an air filter 112 and a mass airflow sensor (air meter) 114 into an air duct 116. The air duct 116 channels air into a compressor 120 of a turbocharger 118 in communication with a turbocharger control 68 (FIG. 1). Air is then channeled from the compressor 120 into a first charge air cooler 126. The first charge air cooler 126 is connected to a supercharger 134. A first charge air cooler bypass valve 132 is connected between an air inlet and an air outlet of the first charge air cooler 126 to selectively divert air around the first charge air cooler 126.

Air from first charge air cooler 126 is channeled to the air inlet of a supercharger 134, which is driven by the engine 12 through a controllable clutch 140 in communication with a supercharger control 66 (FIG. 1). A controllable supercharger bypass valve 142 allows air to bypass the supercharger 134. The air from the supercharger 134 and/or from the supercharger bypass valve 142 is channeled to a second charge air cooler bypass valve 144. The second charge air cooler bypass valve 144 selectively provides air to a second charge air cooler 152 and/or an air intake manifold 158 of the engine 12. An air valve control 64 (FIG. 1) is in communication with the first charge air cooler bypass valve 132, supercharger bypass valve 142 and second charge air cooler bypass valve 144 to coordinate the flow of air therethrough.

An air intake heater 80 is arranged in each of an intake runner of the air intake manifold 158. Each air intake heater 80 is in communication with a heater control 72 (FIG. 1) and is configured to heat air at the intake port of a corresponding cylinder 14 of the engine 12. Alternatively, a single heat source may be disposed in the air intake manifold 158 so as to heat air supplied to all of the intake ports of the engine 12.

With continuing reference to FIG. 2, following a combustion event, exhaust gas exits one or more exhaust ports 160 of the engine 12 and is channeled to the turbine 162 of the turbocharger 118. Exhaust gas exiting the turbine 162 passes through a catalytic converter 170. Upon exiting the catalytic converter 170, the exhaust gas can follow one of two paths. A portion of the exhaust gas may pass through a low pressure loop (LPL) that includes an EGR cooler 164 and an EGR valve 166 that is controlled by an EGR driver 74 (FIG. 1), to be reintroduced into the intake air stream at air duct 116. The remainder of the exhaust gas that is not recirculated through the EGR system passes through a backpressure valve 168, which is in communication with a backpressure control 60 (FIG. 1), and a muffler 172, to be exhausted out a tail pipe.

It will be appreciated from the foregoing description of FIG. 2 that some of the components in FIG. 2 affect the temperature and/or the pressure of the gas flowing through the component. For example the turbocharger compressor 120 and the supercharger 134 each increase both the temperature and the pressure of air flowing therethrough. The first charge air cooler 126, the second charge air cooler 152, and the EGR cooler 164 are each heat exchangers that affect the temperature of the gas (air or exhaust gas) flowing therethrough by transferring heat between the gas and another medium. In one embodiment, the other heat transfer medium is a liquid coolant provided in coolant system 63 (FIG. 1), which includes a high temperature cooling loop and/or a low temperature cooling loop regulated by a coolant control 62 (FIG. 1). In an alternate embodiment, a gaseous coolant may be used in lieu of a liquid coolant. An oil control 70 (FIGS. 1 and 2) may also be used to regulate the flow of oil, and therefore the oil temperature, through the engine 12.

Returning to FIG. 1, the engine control system 10 includes a combustion sensing device 82, such as a pressure sensor, arranged in the combustion chamber 18. The combustion sensing device 82 provides a signal to a combustion feedback module 84 that is indicative of in-cylinder conditions within the combustion chamber 18, such combustion characteristics and/or pre-combustion conditions. Another example combustion sensing device 82 detects heat release. Other devices that may be useful for indicating some aspect of the combustion process are a knock sensor or an ion sensor. The combustion detection device 82 may be any one of the exemplary sensors, other suitable sensor, or a combination of two or more sensors arranged to provide an indication of in-cylinder conditions.

The controller 30 has other modules relating to desired engine operation, including target Indicated Mean Effective Pressure (IMEP) 86, combustion parameter targets 88, and steady state control targets 90, which may be organized in steady state calibration tables stored in memory. Combustion parameter targets 88 may correspond to empirically determined values relating to the combustion process within the combustion chamber 18 during various engine operating conditions. Although not shown, the engine control system 10 may include additional sensors or estimators to determine temperature and/or pressure and/or oxygen concentration (for example, in-cylinder conditions within the combustion chamber 18) and/or humidity at locations within the air intake system and/or the engine exhaust system, which may be provided as actual engine states 92.

As previously explained, the fuel injector 38 is configured to deliver multiple fuel injections to the combustion chamber 18, which necessarily includes a "last" fuel injection.

Figure 6:
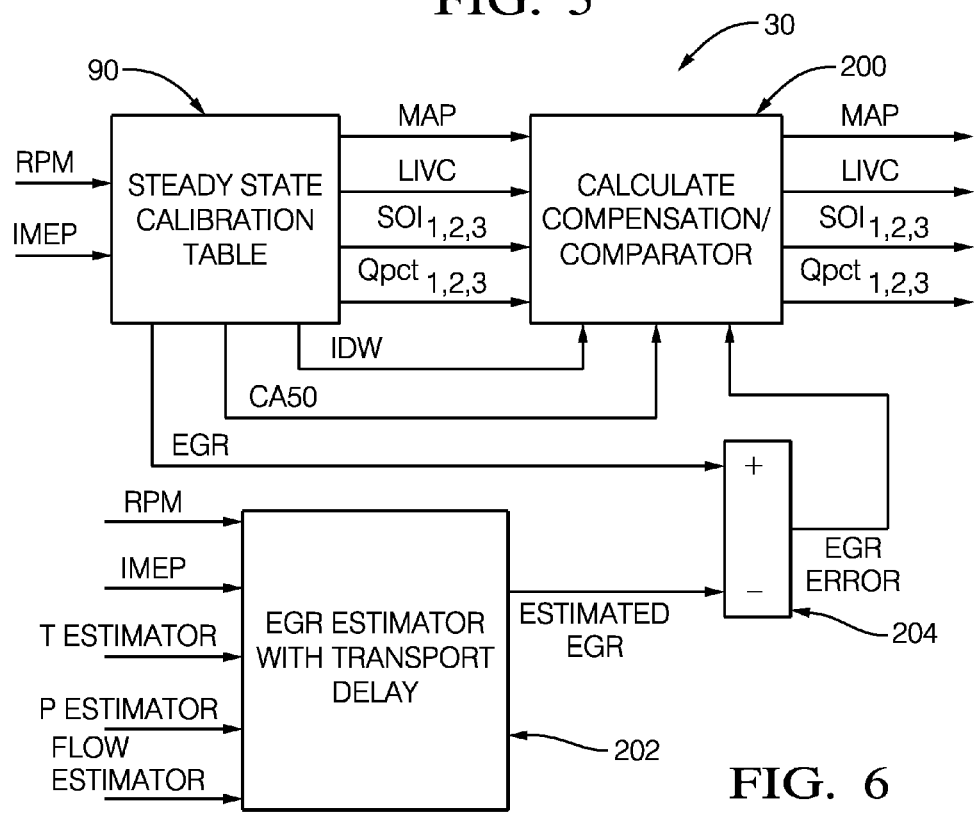
FIG. 6 is a schematic illustrating control logic for a portion of a controller shown in FIG. 1 that provides transient EGR error compensation.

Referring to FIG. 6, the controller 30 includes a steady state calibration table of desired early injection parameters for steady state engine operation, which is part of the steady state control targets 90 stored in memory 94. In one example, the steady state calibration table provides desired steady state values for a manifold absolute pressure (desired steady state MAP), a late inlet valve closing timing (desired steady state LIVC), a start of injection for the multiple fuel injections (desired steady state $SOI_{1,2,3}$), and a fuel mass for the multiple fuel injections (desired steady state $Q_{pct1,2,3}$), which are based upon an engine speed (N RPM) and indicated mean effective pressure (IMEP). The steady state calibration table may also provide desired steady state values for an exhaust gas recirculation (desired steady state EGR), a 50% fuel burn for the multiple fuel injections (desired steady state CA50) and an ignition dwell (desired steady state IDW), which are also based upon an engine speed and IMEP. Additional and/or different steady states values may be used to provide an EGR error estimate.

An exhaust gas recirculation estimator 202 is used to determine a transport delay associated with an EGR departure from the steady state calibration table during a load transient. In one example, the exhaust gas recirculation estimator 202 is configured to estimate an amount of exhaust gas recirculation based upon the engine speed, the indicated mean effective pressure, an intake manifold temperature (T estimator), an intake manifold pressure (P estimator), and an airflow (flow estimator) to the combustion chamber 18.

Figure 3:
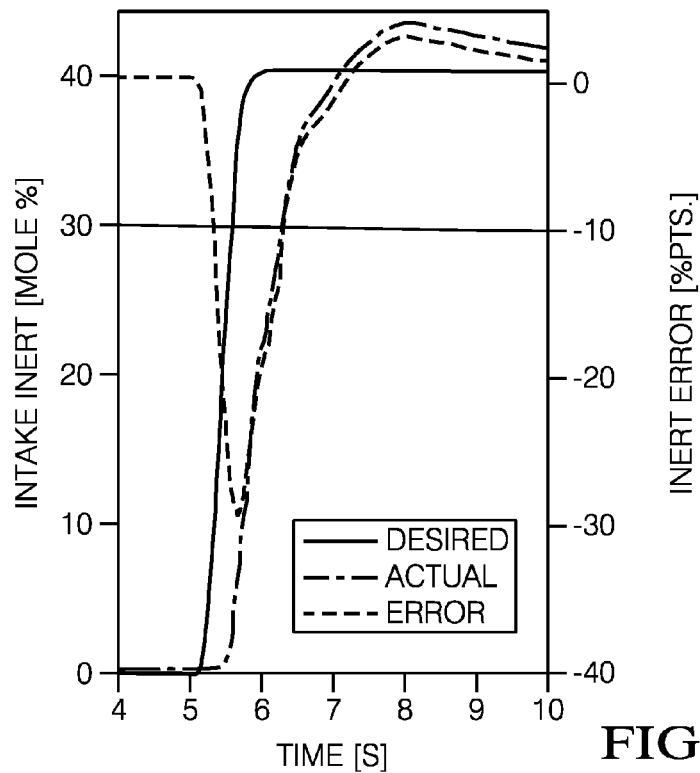
FIG. 3 is graph depicting exhaust gas recirculation (EGR) error during a rapid accelerator pedal "tip in," which creates an engine load transient.

A comparator 200 is configured to calculate a delay compensation for the last fuel injection using the exhaust gas recirculation estimator 202 and the steady state calibration table. Generally, the controller 30 is configured to determine an exhaust gas recirculation error 204 based upon an estimated exhaust gas recirculation from the exhaust gas recirculation estimator 202 and an expected exhaust gas recirculation from the steady state calibration table. An example EGR error due to "tip-in" load transients is graphically depicted in FIG. 3. In particular, in the example, the comparator 200 is configured to determine the delayed last fuel injection and a fuel mass for the multiple fuel injections based upon the exhaust gas recirculation error 202. The controller 30 is configured to command the fuel injector 38 to deliver the multiple injections with the delayed last fuel injection to compensate for the transport delay.

Various engine operating parameters are used to determine new transient values based upon the EGR transport delay (manifesting itself as EGR error relative to steady state values) caused by a "tip-in" or "tip-out" type load transient. For example, the comparator 200 is configured to determine the delayed last fuel injection ($SOI_3$ of a three injection scheme represented by new desired transient $SOI_{1,2,3}$) and a fuel mass (new desired transient $Q_{pct1,2,3}$) for the multiple fuel injections based upon at least one of a manifold absolute pressure (desired steady state MAP), a late inlet valve closure timing (desired steady state LIVC), a start of injection for the multiple fuel injections (desired steady state $SOI_{1,2,3}$), a fuel mass quantities for each of the multiple fuel injections (desired steady state $Q_{pct1,2,3}$), an exhaust gas recirculation (desired steady state EGR), a desired 50% fuel burn (desired steady state CA50) and an ignition dwell (desired steady state IDW) from the steady state calibration table. This method of transient EGR error compensation can be applied in combination with other compensation methods, such as MAP compensation and LIVC compensation, if used.

Figure 4:
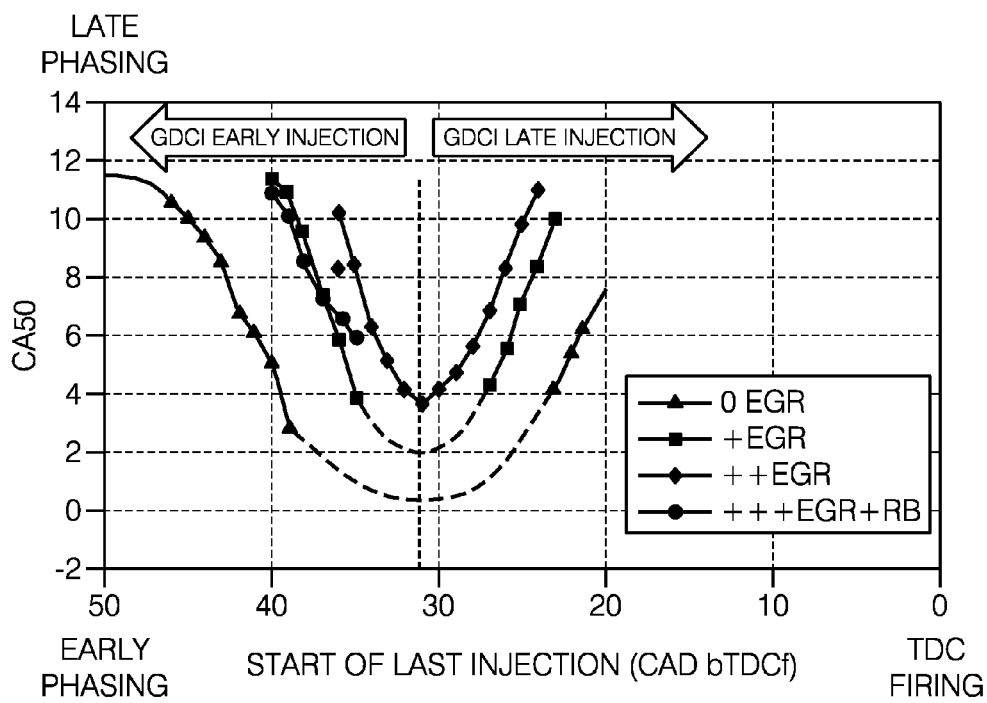
FIG. 4 is a graph illustrating timing of 50% fuel burned, CA50, versus the start of the last fuel injection relative to top dead center for various amounts of EGR.

Referring to FIG. 4, a graph is shown illustrating 50% combustion of fuel (CA50) versus the start of the last fuel injection relative to top dead center (bTDCf) for various amounts of EGR. Measured CA50 is graphed as a function of SOIlast as measured in a GDCI engine. Four injection timing sweeps were performed for various combinations of EGR and exhaust rebreathing (RB). The greater number of "+" indicate a larger amount of EGR. For each injection sweep, depending on these quantities, combustion phasing can be increased or decreased (up or down in the figure). The response to changes of $SOI_{last}$ in FIG. 4 is typical of GDCI combustion systems. For early injection timing, advancing $SOI_{last}$ produces retarded combustion phasing (left side of the figure). Advanced SOIlast injects fuel when cylinder pressure and temperature are lower, which provides more time for mixing prior to autoignition. This reduces charge stratification and causes ID to increase and combustion phasing to retard. For late injection timings (right side of figure), retarding $SOI_{last}$ produces retarded combustion phasing. These two modes are referred to as "Early GDCI Injection" and "Late GDCI Injection." According the disclosed engine control system and method, Late GDCI Injection is used to retard combustion phasing during "tip-in" load transients.

In the example for Early GDCI Injection, the last fuel injection under the desired early injection parameters for the steady state engine operation occurs between 50° before top dead center and 30° before top dead center, and the delayed last fuel injection using Late GDCI Injection occurs between 30° before top dead center and 0° before top dead center.

Figure 5:
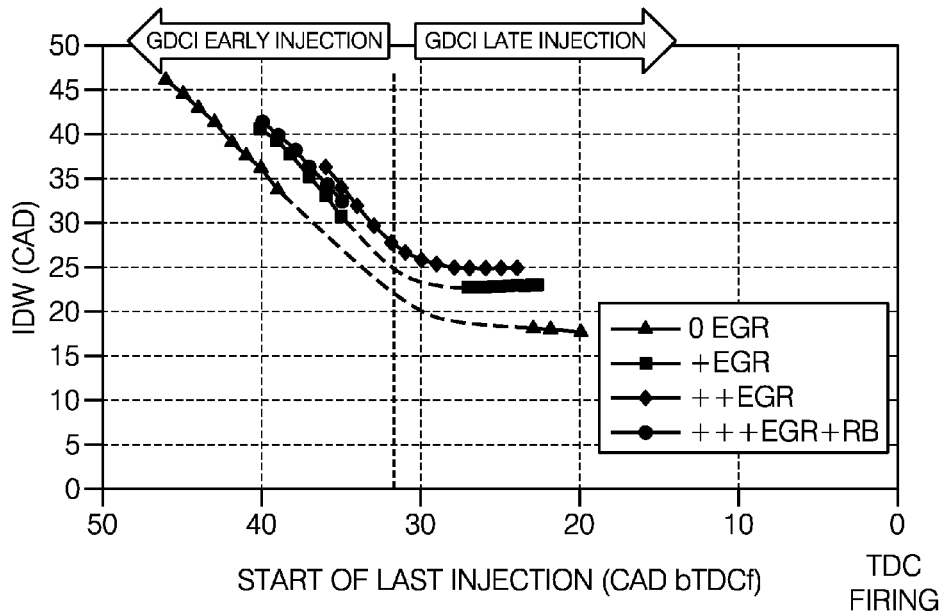
FIG. 5 is a graph illustrating ignition dwell versus the start of the last fuel injection relative to top dead center for various amounts of EGR.

Referring FIG. 5, a graph is shown illustrating ignition dwell (IDW) versus the start of the last fuel injection relative to top dead center (bTDCf) for various amounts of EGR. In the example, the ignition dwell (IDW) for the delayed last fuel injection is between 30° and 15°, and, for example, the delayed last fuel injection occurs between 30° before top dead center and 10° before top dead center at 1500 engine crankshaft revolutions per minute. FIG. 5 shows that for Early GDCI Injection, ignition dwell (IDW) increases linearly with $SOI_{last}$ advance, while for Late GDCI Injection, IDW is essentially constant as $SOI_{last}$ is retarded. IDW is defined as the time between the end of the last injection to start of combustion (SOC). IDW is considered a key mixing parameter for GDCI.

In normal operation, the engine control system provides a method of controlling combustion that includes recirculating exhaust gases to the combustion chamber 18 using desired early injection parameters for a steady state engine operation, which may be provided as part of the steady state control targets 90 and stored in the memory 94 in the controller 30, for example, in a look-up table format. In the example, EGR from the low-pressure loop downstream from a turbocharger is recirculated to an intake manifold upstream from the combustion chamber, for example to the intake ports.

When a load increase is commanded relative to the steady state engine operation, insufficient recirculated exhaust gases are delivered to the combustion chamber 18 due to transport delay of the EGR gases. A last fuel injection into the combustion chamber is delayed in response to the detected load increase and during an engine cycle with multiple fuel injections as compared to the steady state engine operation. The first and second fuel injections to the combustion chamber may also be altered compared to steady state engine operation during the engine cycle. In one example, all fuel injections under the desired early injection parameters for the engine cycle occur before top dead center. In another example, all fuel injections under all engine operating conditions (i.e., idle, light, medium and heavy loads) for the engine cycle occur before top dead center.

Combustion phasing is retarded within the combustion chamber in response to the delayed injection, which achieves desired combustion characteristics and engine operation and emissions. EGR error compensation during fast transients uses a large retard of the last injection ($SOI_{last}$) using GDCI Late Injection Strategy. The advantage of this approach is that retarding $SOI_{last}$ does not shorten IDW for Late GDCI Injection (FIG. 5). This means that retarding $SOI_{last}$ will produce retarded combustion phasing, which will directly compensate for momentarily low EGR. It is understood that both fuel consumption and emissions may be compromised during these conditions but only for the short period during the fast transient. Since the smoke increase for retarded $SOI_{last}$ is caused by piston wetting, improved matching of the spray and piston bowl geometry can reduce this source of emissions and extend the smoke limit to later injection timings.

The example above illustrates control actions needed during a load increase. For a transient load decrease due to tip-out, transport delay causes excess EGR in the cylinder, and the opposite compensating control actions are required. $SOI_{last}$ must be retarded for Early GDCI Injection and advanced for Late GDCI Injection.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. For example, although FIGS. 4 and 5 relate to values at 1500 engine RPM, the disclosed principles also apply to other engine operating conditions and speeds. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method of controlling combustion comprising the steps of:
   recirculating exhaust gases to a combustion chamber using early injection parameters for a steady state engine operation;
   detecting a load increase relative to the steady state engine operation;
   delivering recirculated exhaust gases to the combustion chamber in response to the detected load increase;
   delaying a last fuel injection into the combustion chamber during an engine cycle with multiple fuel injections as compared to the steady state engine operation; and
   retarding combustion phasing within the combustion chamber in response to the delayed injection.

2. The method according to claim 1, wherein the step of recirculating exhaust gases includes recirculating exhaust gases downstream from a turbocharger to an intake manifold upstream from the combustion chamber.

3. The method according to claim 1, wherein the last fuel injection under the desired early injection parameters for the steady state engine operation occurs between 50° before top dead center and 30° before top dead center, and the delayed last fuel injection occurs between 30° before top dead center and 0° before top dead center.

4. The method according to claim 3, wherein an ignition dwell for the delayed last fuel injection is between 30° and 15° crank angle degrees in duration.

5. The method according to claim 3, wherein the delayed last fuel injection occurs between 30° before top dead center and 0° before top dead center at 1500 engine crankshaft revolutions per minute.

6. The method according to claim 1, wherein the multiple fuel injections include first and second fuel injections, and the delaying step includes delaying the first and second fuel injections to the combustion chamber compared to the steady state engine operation during the engine cycle.

7. The method according to claim 1, wherein the multiple fuel injections include first and second fuel injections, and the delaying step includes changing the quantities of injected fuel compared to the steady state engine operation during the engine cycle.

8. The method according to claim 1, wherein the step of detecting a load increase is performed prior to the step of reducing recirculated exhaust gases.

9. The method according to claim 8, wherein the step of reducing recirculated exhaust gases is a result of a lag in transport of the recirculated exhaust gases in response to an acceleration request.

10. The method according to claim 1, wherein all fuel injections under the desired early injection parameters for the engine cycle occur before top dead center.

11. The method according to claim 10, wherein all fuel injections under all engine operating conditions for the engine cycle occur before top dead center.

12. An engine control system comprising:
a fuel injector configured to deliver multiple fuel injections to a combustion chamber, the multiple fuel injections includes a last fuel injection;
an exhaust gas recirculation passage configured to supply exhaust gases to a location upstream from the combustion chamber; and
a controller including a steady state calibration table of early injection parameters for a steady state engine operation, an exhaust gas recirculation estimator relating to a transport delay associated with a departure from the steady state calibration table, and a comparator configured to calculate a delay compensation for the last fuel injection using the exhaust gas recirculation estimator and the steady state calibration table, the controller configured to command the fuel injector to deliver the multiple injections with the delayed last fuel injection to compensate for the transport delay by retarding combustion phasing within the combustion chamber in response to the delayed injection.

13. The engine control system according to claim 12, wherein the steady state calibration table provides steady state values for a manifold absolute pressure, a late inlet valve closing timing, a start of injection for the multiple fuel injections, and a fuel mass for the multiple fuel injections, which are based upon an engine speed and indicated mean effective pressure.

14. The engine control system according to claim 12, wherein the steady state calibration table provides steady state values for an exhaust gas recirculation, a 50% fuel burn for the multiple fuel injections and an ignition dwell, which are based upon an engine speed and indicated mean effective pressure.

15. The engine control system according to claim 12, wherein the exhaust gas recirculation estimator is configured to estimate an amount of exhaust gas recirculation based upon an engine speed, an indicated mean effective pressure, an intake manifold temperature, an intake manifold pressure, and an airflow to the combustion chamber.

16. The engine control system according to claim 12, wherein the controller is configured to determine an exhaust gas recirculation error based upon an estimated exhaust gas recirculation from the exhaust gas recirculation estimator and an expected exhaust gas recirculation from the steady state calibration table.

17. An engine control system comprising:
a fuel injector configured to deliver multiple fuel injections to a combustion chamber, the multiple fuel injections includes a last fuel injection;
an exhaust gas recirculation passage configured to supply exhaust gases to a location upstream from the combustion chamber; and
a controller including a steady state calibration table of early injection parameters for a steady state engine operation, an exhaust gas recirculation estimator relating to a transport delay associated with a departure from the steady state calibration table, and a comparator configured to calculate a delay compensation for the last fuel injection using the exhaust gas recirculation estimator and the steady state calibration table, the controller configured to command the fuel injector to deliver the multiple injections with the delayed last fuel injection to compensate for the transport delay by retarding combustion phasing within the combustion chamber in response to the delayed injection;
wherein the controller is configured to determine an exhaust gas recirculation error based upon an estimated exhaust gas recirculation from the exhaust gas recirculation estimator and an expected exhaust gas recirculation from the steady state calibration table; and
wherein the comparator is configured to determine the delayed last fuel injection and a fuel mass for the multiple fuel injections based upon the exhaust gas recirculation error.

18. The engine control system according to claim 17, wherein the comparator is configured to determine a start of injection for the delayed last fuel injection and a fuel mass for the multiple fuel injections based upon at least one of a manifold absolute pressure, a late inlet valve closure timing, a start of injection for the multiple fuel injections, a fuel mass for the multiple fuel injections at steady state, an exhaust gas recirculation, a 50% fuel burn for the multiple fuel injections and an ignition dwell from the steady state calibration table.

19. The engine control system according to claim 12, wherein the last fuel injection under the desired early injection parameters for the steady state engine operation occurs between 50° before top dead center and 30° before top dead center, and the delayed last fuel injection occurs between 30° before top dead center and 10° before top dead center.

20. The engine control system according to claim 19, wherein an ignition dwell for the delayed last fuel injection is between 30° and 15° crank angle degrees in duration.

* * * * *